United States Patent [19]

Okubo

[11] Patent Number: 5,307,275
[45] Date of Patent: Apr. 26, 1994

[54] ANTI-LOCK BRAKING CONTROL METHOD AND APPARATUS FOR A VEHICLE

[75] Inventor: Satomi Okubo, Saitama, Japan

[73] Assignee: Akebono Brake Industry Co., Ltd., Tokyo, Japan

[21] Appl. No.: 694,633

[22] Filed: May 2, 1991

[30] Foreign Application Priority Data

May 9, 1990 [JP] Japan .................. 2-117685

[51] Int. Cl.$^5$ ............................ B60T 8/66; B60T 8/34
[52] U.S. Cl. .................... 364/426.02; 303/96; 303/103
[58] Field of Search ............ 364/426.01, 426.02, 364/426.03; 180/197; 303/91, 93, 94, 95, 96, 100, 102, 103–111

[56] References Cited

U.S. PATENT DOCUMENTS

| | | | |
|---|---|---|---|
| 4,762,375 | 8/1988 | Maki et al. | 303/96 |
| 4,773,714 | 9/1988 | Shimanuki et al. | 303/108 |
| 4,797,825 | 1/1989 | Shimanuki et al. | 364/426.02 |
| 4,807,133 | 2/1989 | Shimanuki et al. | 364/426.02 |
| 4,883,325 | 11/1989 | Shimanuki et al. | 303/96 |
| 4,982,806 | 1/1991 | Yoshizawa et al. | 180/197 |
| 4,984,164 | 1/1991 | Maehara et al. | 364/426.02 |
| 4,991,910 | 2/1991 | Shimanuki et al. | 303/109 |
| 5,092,662 | 3/1992 | Okubo | 303/106 |
| 5,105,359 | 4/1992 | Okubo | 364/426.02 |
| 5,123,715 | 6/1992 | Okubo | 303/108 |

FOREIGN PATENT DOCUMENTS 0051801  5/1982  European Pat. Off. .
3929996  3/1990  Fed. Rep. of Germany .

*Primary Examiner*—Thomas G. Black
*Assistant Examiner*—Colllin W. Park
*Attorney, Agent, or Firm*—Cushman, Darby & Cushman

[57] ABSTRACT

An anti-lock braking control method for a vehicle for preventing locking of vehicle wheels, wherein brake hydraulic pressure is controlled in accordance with a wheel speed to be controlled in each brake control system or channel. The increase in the brake hydraulic pressure in one of the brake control channels is started when a predetermined condition is determined to be met in that control channel and after the predetermined condition is also determined to by met in another control channel. The predetermined condition is determined to be met for a control channel when the system speed Vs for that control channel becomes higher than a speed $Vv - \Delta Vo$, which corresponds to the estimated vehicle speed $Vv$ lowered by a predetermined minute value $\Delta Vo$.

3 Claims, 3 Drawing Sheets

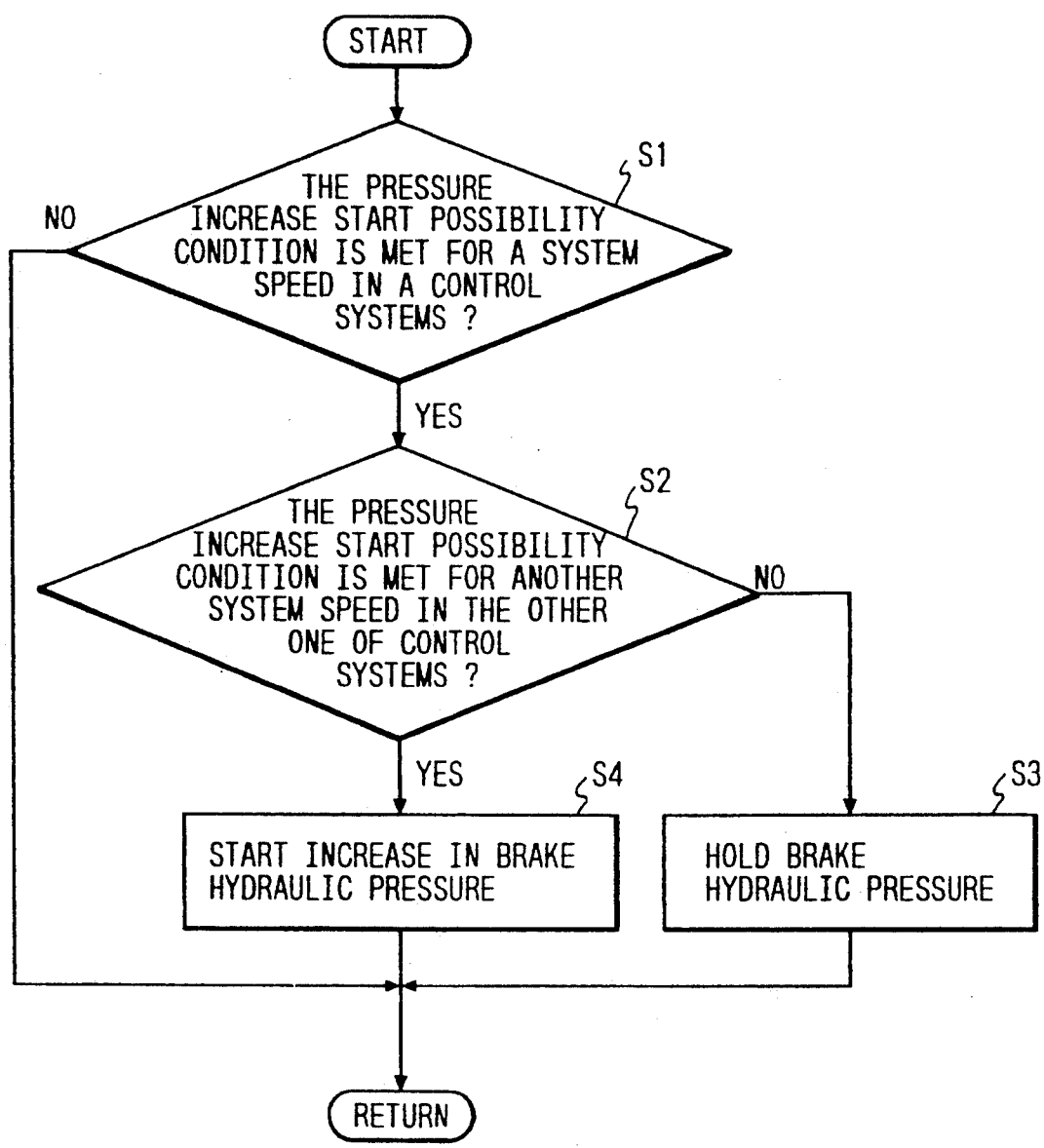

ANTI-LOCK BRAKING CONTROL METHOD AND APPARATUS FOR A VEHICLE

BACKGROUND OF THE INVENTION

The present invention relates to an anti-lock braking control method and apparatus for preventing locking of automotive wheels of a running vehicle during braking.

Generally, in an anti-lock control apparatus for automotive vehicles, to maintain steering ability and running stability during braking, a control unit including a microcomputer controls brake hydraulic pressure. This brake pressure control also reduces braking distance.

During operation of the anti-lock control apparatus, a control mode for brake hydraulic pressure is determined based on an electric signal indicative of a wheel speed. This wheel speed is detected by a wheel speed sensor. According to the control mode, a hold valve, which is a normally opened solenoid valve, and a decay valve which is a normally closed solenoid valve, are selectively opened or closed to increase, hold constant and decrease the brake hydraulic pressure.

In such anti-lock control devices, as disclosed in the U.S. Pat. No 4,984,164, a reference speed for deciding when to decrease the brake hydraulic pressure is set or determined in accordance with a wheel speed (herein after referred as system speed Vs) to be controlled in each brake control system or channel. There is also set an estimated vehicle speed Vv having a predetermined follow-up limit of acceleration/deceleration with respect to the highest wheel speed among four wheel speeds. Further, there is set a threshold speed which tracks the estimated vehicle speed Vv with a predetermined speed difference therefrom and which is below the estimated vehicle speed Vv.

Based on the comparison of the system speed Vs with the reference speed or the threshold speed and also on the detected high peak point and low peak point of the system speed Vs, a pressure decrease status, a pressure hold status and a pressure increase status are set. Then, a plurality of hydraulic pressure valves (solenoid valves) are turned on and off in accordance with a predetermined control mode set for each of these statuses, thereby effecting the pressure decrease, pressure hold and pressure increase.

However, since the brake hydraulic pressure for each wheel, which is subjected to the anti-lock control through the corresponding brake control channel, is subjected to regulation such as increase, decrease and holding, without regard to the state of the regulation of the brake hydraulic pressure for another wheel, which is subjected to the anti-lock control through another corresponding brake control channel, all the brake control channels often act simultaneously with each other to start the increase in the brake hydraulic pressure for the four wheels of the vehicle at the same time. For that reason, when the speeds of the four wheels have dropped simultaneously with each other and because the estimated vehicle speed Vv is set on the basis of the highest one of the wheel speeds and each of the wheel speeds is compared with the estimated vehicle speed to perform the anti-lock control, the estimated vehicle speed becomes so different from the actual speed of the vehicle that the anti-lock control cannot be accurately performed.

Besides, when the four wheel speeds have dropped simultaneously with each other, moment of yawing, pitching or the like is likely to act to the vehicle to make the vehicle unstable.

SUMMARY OF THE INVENTION

It is an object of the present invention to provide an anti-lock control method for a vehicle so as to solve the above-identified problems associated with the prior art.

According to the principles of the present invention, the controlled wheel speeds, i.e. system speeds Vs, are handled in a plurality of brake control channels for the vehicle, respectively, and the brake hydraulic pressure for a wheel or wheels of the vehicle in each one of the brake control channels is alternately increased and decreased on the basis of the results of the detection of the states of changes with respect to one of system speeds Vs so as to prevent the wheel or wheels from being locked in the braking thereof. The method is characterized in that a pressure increase start condition relating to a state of recovery of each of the system speeds Vs after the decrease in the brake hydraulic pressure is preset; and the increase in the brake hydraulic pressure through one of the brake control channels is started when the pressure increase start condition is met in another one of the brake control channels subsequently to the meeting of the condition for the former one of the brake control channels. In other words, the increase in the brake hydraulic pressure is not yet started at the time of meeting of the condition for the former brake control channel, but is started at the time of the subsequent meeting of the condition for the latter brake control channel. For that reason, an increase in brake pressure is prevented from being started through all the control channels simultaneously. As a result, one of the system speeds which are, respectively, controlled through the brake control channels is always near the actual speed of the vehicle so that an estimated vehicle speed set on the basis of the highest one of all wheel speeds is always near the actual speed of the vehicle. In other words, the estimated vehicle speed can be accurately calculated. This results in making the anti-lock control more accurate. Besides, since not all of the wheels are simultaneously braked, a sideways force can be secured for at least one of the wheels corresponding to the control channels, to stabilize the behavior of the body of the vehicle.

BRIEF DESCRIPTION OF THE DRAWINGS

In the accompanying drawings:

FIG. 3 is a flow chart for the pressure increase start time point determination in accordance with the method of the present invention.

DETAILED DESCRIPTION OF THE PREFERRED EMBODIMENTS

Figure 1:
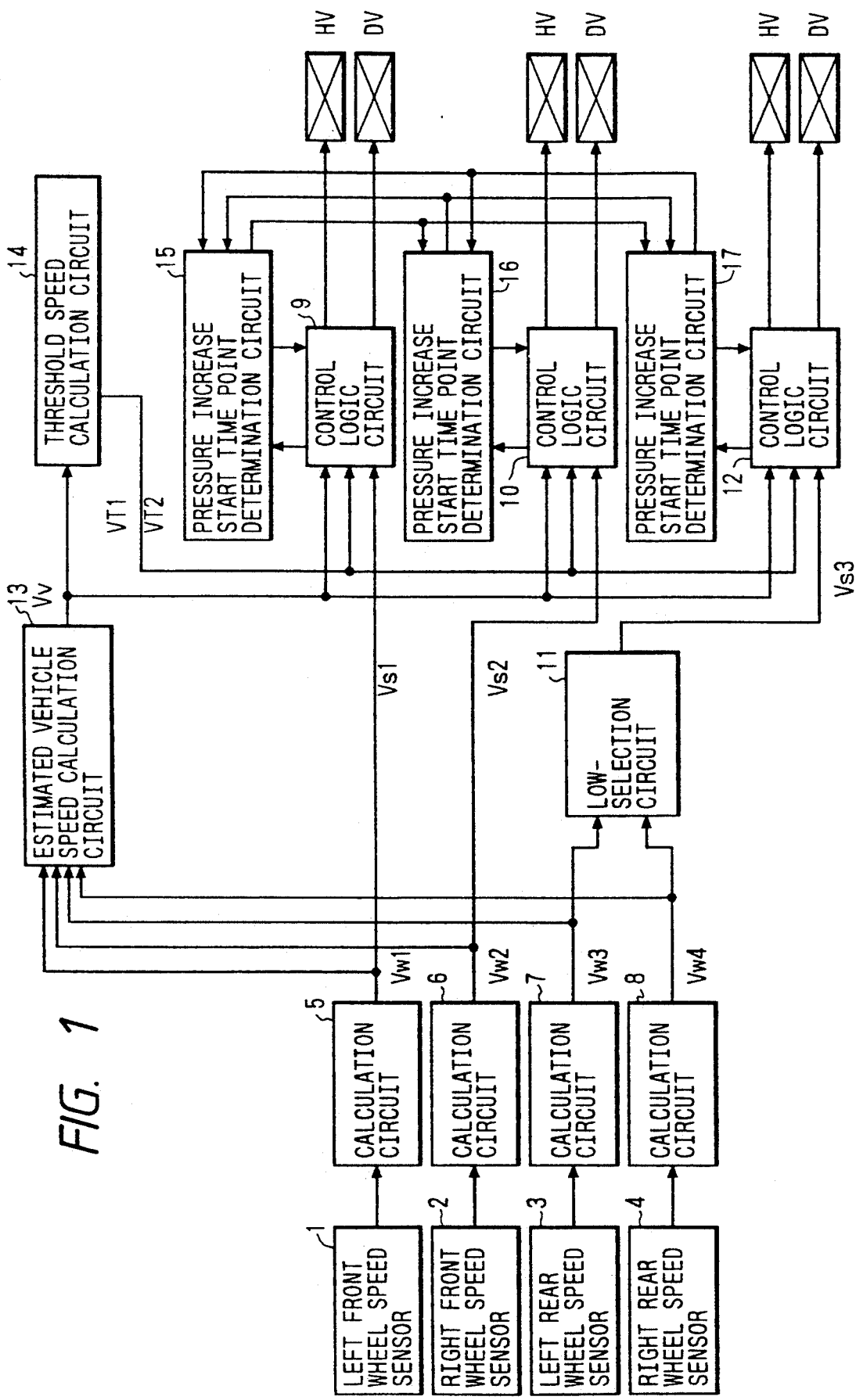
FIG. 1 is a block diagram showing a three-channel anti-lock control apparatus for practicing a method according to the present invention.

An embodiment of the present invention will now be described with reference to the accompanying drawings attached hereto in which FIG. 1 is a block diagram showing a three-channel anti-lock control apparatus for practicing the present invention.

Output signals provided by wheel sensors 1 to 4 are transmitted to calculation circuits 5 to 8, respectively. These output signals are indicative of the wheel speeds as detected by wheel sensors 1 to 4, respectively. The left front wheel speed signal Vw1 and the right front wheel speed signal Vw2 are directly transmitted as first and second system speed signals Vs1 and Vs2 to first and second control logic circuits 9 and 10, respectively. A lower rear wheel speed is selected between the left rear wheel speed signal Vw3 and the right rear wheel speed signal Vw4 in a rear wheel speed low-selection circuit 11. This lower rear wheel speed is transmitted as a third system speed signal Vs3 to a third control logic circuit 12. Each of the control logic circuits 9, 10 and 12 treats the respective system speed signals Vs1, Vs2 or Vs3 as a controlled object. In accordance with the respective system speed signals Vs1, Vs2 and Vs3, which are indicative of the wheel speeds, each of the control logic circuits 9, 10 and 12 controls the opening and closing of the hold valve HV and the decay valve DV.

The signals representing the wheel speeds Vw1 to Vw4, respectively, are also transmitted to an estimated vehicle speed calculation means 13. In the estimated wheel speed calculation means 13, the highest wheel speed is selected from among the four wheel speeds Vw1 to Vw4 and an estimated vehicle speed Vv is obtained with a limitation of acceleration/deceleration of ±1 G which is the limitation of the wheel with the highest speed. The estimated vehicle speed Vv is output to the control logic circuits 9, 10 and 12.

The estimated vehicle speed Vv obtained by the calculation circuit 13 is also provided to a threshold speed calculation circuit 14. The calculation circuit 14 calculates first and second threshold speeds VT1 and VT2, each of which tracks the estimated vehicle speed Vv with respect to a predetermined speed differences therefrom such that $Vv \geq VT1 \geq VT2$, and outputs signals indicative thereof to the control logic circuits 9, 10 and 12.

Pressure increase start time point determination circuits 15, 16 and 17 are connected to the control logic circuits 9, 10 and 12, respectively. Each of the pressure increase start time point determination circuits 15, 16 and 17 functions such that when a signal indicating that a pressure increase start condition, which relates to the state of recovery of the system speed Vs in the control channel corresponding to the circuit and which is sent by the control logic circuit when the system speed Vs has reached a speed $Vv - \Delta V_O$ corresponding to the estimated vehicle speed Vv is met is received by the determination circuit from the control logic circuit corresponding to the control channel, the determination circuit sends out a signal to the other two pressure increase start time point determination circuits corresponding to the other two control channels. Instead of such a pressure increase start system, a pressure increase start determination condition is preset in a conventional anti-lock control method, and, therefore, no such communication between each brake control circuit takes place in conventional brake control methods.

Figure 2:
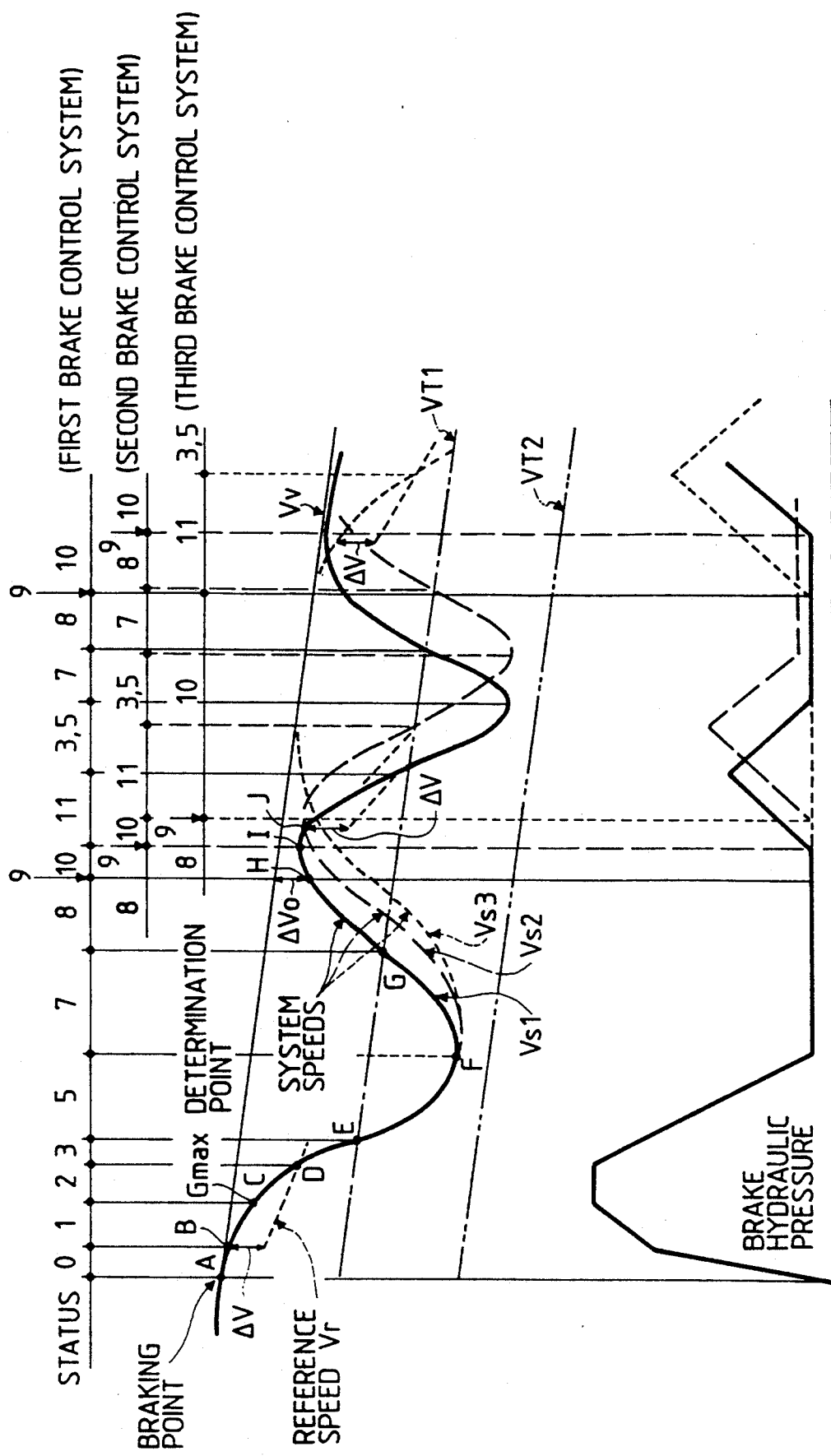
FIG. 2 is a time chart illustrating an anti-lock control operation according to the method of the present invention.

The start of the increase in the brake hydraulic pressure for each of the wheels of the vehicle in the three-channel anti-lock control thereof, which is performed in the method with the use of the anti-lock control apparatus through handling the speeds of the right and left front wheels of the vehicle independently from each other in the first and the second control channels and handling the selected lower one of the speeds of the right and left rear wheels of the vehicle in the third control channel, is determined as described from now on with reference to FIG. 2, which is a time chart of the method.

When the pressure increase start condition that the system speed Vs1, for example, which is subjected to the anti-lock control through the first control channel for the left front wheel of the vehicle, has recovered to exceed the speed $Vv - \Delta V_O$ is met, the signal indicating that the condition is met is sent out from the control logic circuit 9 through the pressure increase start time point determination circuit 15 to the pressure increase start time point determination circuits 16 and 17 in the other two, control channels. At the time this condition is met, the increase in the brake hydraulic pressure is not yet started, which differs from the conventional anti-lock braking methods. When the pressure increase start condition that the system speed Vs2, for example, which is subjected to the anti-lock control through the second control channel for the right front wheel of the vehicle, has recovered to exceed the speed $Vv - \Delta V_O$ is met after the pressure increase start condition for the system speed Vs1 in the first control channel is met, the signal indicating the meeting of the condition for the system speed Vs2 is sent out from the control logic circuit 10 through the pressure start time point determination circuit 16 for the second control channel to the other pressure start time point determination circuits 15 and 17. When this signal is received by the circuit 15 from the circuit 16, the increase in the brake hydraulic pressure for the left front wheel is started through the first control channel.

Similarly, the increase in the brake hydraulic pressure for the right front wheel is not yet started at the time of meeting of the condition that the system speed Vs2 has reached to exceed the speed $Vv - \Delta V_O$. When the pressure increase start condition that the system speed Vs3, which is subjected to the anti-lock control through the third control channel for the right and left rear wheel of the vehicle, has recovered to exceed the speed $Vv - \Delta V_O$ is met after the condition for the system speed Vs2 in the second control channel is met, the signal indicating the meeting of the condition for the system speed Vs3 is sent out from the control logic circuit 12 through the pressure start time point determination circuit 17 for the third control channel to the other pressure start time point determination circuits 16 and 17. At the time of reception of the signal by the circuit 16 from the circuit 17, the increase in the brake hydraulic pressure for the right front wheel is started through the second control channel.

In the embodiment of the present invention, the increase in the brake hydraulic pressure for the wheel or wheels corresponding to one control channel is determined so that the increase in the brake hydraulic pressure is not yet started at the time of meeting of the pressure increase start condition for the one control channel but instead starts after the pressure increase start condition for the other one of the control channels is met.

The statuses of the anti-lock control, which are set to distinguish between portions of the control, are described below with reference to FIG. 2.

The status 0 lasts from a time point A at which a brake switch is turned on by depressing the brake pedal of the vehicle, to a time point B at which a reference speed Vr, which begins to rectilinearly drop as the rate dVs/dt of the decrease in the system speed Vs reaches a prescribed level, is generated. The reference speed Vr is used for determining a pressure decrease start time point, and follows the system speed Vs with a prescribed speed difference $\Delta V$ therefrom. The reference speed Vr is set so that when the rate dVs/dt of the decrease in the system speed Vs has reached the prescribed level of $-1$ G, for example, the reference speed begins to rectilinearly drop at a gradient of $-1$ G. In the status 0, the hold valve HV is open, the decay valve DV is closed, and the brake hydraulic pressure for the wheel is increased by supply of the brake fluid from the master cylinder of the vehicle to the brake cylinder for the wheel.

The status 1 lasts from the time point B at which the reference speed Vr is generated, to a time point C at which the rate dVs/dt of the decrease in the system speed Vs is judged to have reached a prescribed level Gmax. In the status 1, the hold valve HV and the decay valve DV are out of action.

The status 2 (which is a pressure holding status) lasts from the time point C at which the rate dVs/dt of the decrease in the system speed Vs is judged to have reached the prescribed level Gmax, to the earlier one of a time point at which the system speed Vs becomes lower than the reference speed Vr, and a time point at which the system speed Vs becomes lower than the first threshold speed VT1. At the time point C, the hold valve HV is closed so that the brake hydraulic pressure is held. The status 2 terminates at a time point D at which the system speed Vs becomes lower than the reference speed Vr in FIG. 2. If the system speed Vs becomes lower than the first threshold speed VT1 before the time point D, the status 2 terminates when the system speed becomes lower than the first threshold speed VT1.

The status 3 (which is a pressure decrease status) lasts from the time point D at which the system speed Vs becomes lower than the reference speed Vr, to a time point E at which the system speed Vs becomes lower than the first threshold speed VT1. At the time point D, the decay valve DV is opened so that the decrease in the brake hydraulic pressure is started.

The status 4 (which is a pressure decrease status and is not shown in FIG. 2) lasts while the anti-lock control is in a second cycle or other later one and the value of the rate VvG of the decrease in the estimated vehicle speed Vv is not greater than that of $-0.22$ G. The status 4 lasts from a time point at which the system speed Vs becomes lower than the first threshold speed VT1, to a time point at which one of conditions (1), (2) and (3) mentioned below is met.

(1) A condition that a decay timer put into timing action at the time of the start of the decrease in the brake hydraulic pressure completes the timing action to prevent the decrease from becoming excessive.

(2) A condition that the system speed Vs becomes lower than the second threshold speed VT2.

(3) A condition that the channels speed Vs is judged to be at the low peak point thereof.

The status 5 (which is a pressure decrease status) is set while the anti-lock control is in a first cycle or the value of the rate VvG of the decrease in the estimated vehicle speed Vv is greater than that of $-0.22$ G. The status 5 lasts from the time point E at which the system speed Vs becomes lower than the first threshold speed VT1, to the earlier one of a time point F at which the system speed Vs is judged to be at the low peak point thereof, and a time point F' (not shown in FIG. 2) at which the system speed Vs becomes lower than the second threshold speed VT2.

The status 6 (which is a pressure decrease status and is not shown in FIG. 2) lasts from a time point at which the system speed Vs becomes lower than the second threshold speed VT2, to a time point at which the system speed Vs becomes higher than the second threshold speed VT2, through a time point at which the system speed Vs takes the low peak point thereof.

The status 7 (which is a pressure holding status) starts when one of conditions (4), (5) and (6) mentioned below is met.

(4) A condition that the system speed Vs is judged to be at the low peak point thereof, in the status 4 or 5.

(5) A condition that the decay timer completes the timing action in the status 4.

(6) A condition that the system speed Vs becomes higher than the second threshold speed VT2 in the status 6.

The status 7 lasts from the time of meeting of one of the conditions (4), (5) and (6), to a time point G at which the system speed Vs becomes higher than the first threshold speed VT1. If the system speed Vs does not becomes higher than the first threshold speed VT1 in a prescribed time T1 after the start of the status 7, the status is changed for the other status 4 so that the decrease in the brake hydraulic pressure is performed again.

The status 8 (which is a pressure holding status) lasts from the time point G at which the system speed Vs becomes higher than the first threshold speed VT1, to a time point H at which the system speed Vs becomes equal to the speed $Vv - \Delta V_O$, which corresponds to the estimated vehicle speed Vv lowered by the prescribed minute value $\Delta V_O$.

The status 9 exists at the time point H after which the system speed Vs becomes higher than the speed $Vv - \Delta V_O$, which corresponds to the estimated vehicle speed Vv lowered by the prescribed minute value $\Delta V_O$.

The status 10 (which is a pressure increase stand-by status) lasts from the time point H after which the system speed Vs in the control channel becomes higher than the speed $Vv - \Delta V_O$, to a time point I at which the system speed Vs in the other control channel becomes higher than the speed $Vv - \Delta V_O$. For instance, the status 10 lasts from the time point H after which the system speed Vs1 in the first control channel becomes higher than the speed $Vv - \Delta V_O$, to the time point I at which the system speed Vs2 in the second control channel or the system speed Vs3 in the third control channel becomes higher than the speed $Vv - \Delta V_O$.

The status 11 (which is a pressure increase status) lasts from the time point I at which the system speed Vs in the other control channel becomes higher than the speed $Vv - \Delta V_O$, to a time point J at which the reference speed Vr is generated.

The status 12 (which is a pressure increase status) lasts from the time point J at which the reference speed Vr is generated, to the earlier one of a time point at which the system speed Vs becomes lower than the reference speed Vr, and a time point at which the system speed Vs becomes lower than the first threshold speed VT1. At the end of the status 12, the status 4 or 5 starts.

FIG. 3 is a flow chart of a pressure increase start time point determination routine which shows a feature of the present invention and is a part of the embodiment. In step S1, it is judged whether the pressure increase start condition, that the system speed Vs in the control channel is higher than the speed $Vv - \Delta V_O$, which corresponds to the estimated vehicle speed Vv lowered by the prescribed minute value $\Delta V_O$ after the status 9, is met for the control channel. If it is judged in step S1 that the condition is met for the control channel, it is judged in step S2 whether the pressure increase start condition that the system speed Vs in the control channel goes into the status 10 and the system speed in the other control channel then recovers to exceed the speed $Vv-\Delta V_O$ after the status 9 is met for the latter control channel. If it is judged in step S2 that the condition is not yet met for the latter control system, then in step S3 brake hydraulic pressure for the wheel corresponding to the former control channel is held. If it is judged in step S2 that the condition is met for the latter control channel, then in step S4 the increase in the brake hydraulic pressure for the wheel corresponding to the former control system is started.

As described above, in the method of the three channels anti-lock control of the vehicle, the speeds Vw1 and Vw2 of the left and right front wheels of the vehicle are handled as the first and the second system speeds Vs1 and Vs2, respectively, and the lower one of the speeds vw3 and Vw4 of the left and right rear wheels of the vehicle is selected as the third system speed Vs3, so that the brake hydraulic pressure for the left front wheel, the right front wheel, and the left and right rear wheels are regulated separately from each other through the three control channels. In the anti-lock control through each control channel, the time point of the start of the increase in the brake hydraulic pressure for the wheel or wheels corresponding to the control channel is determined so that the increase in the brake hydraulic pressure is not yet started at the time of the meeting of the pressure increase start condition for the control channel but instead is started at the time of the subsequent to the meeting of the pressure increase start condition for another control channel. For that reason, the increase in the brake hydraulic pressure is prevented from being started through the three control channels simultaneously in the anti-lock control of the vehicle.

In addition, the present invention is explained above along the three-channel anti-lock control method and apparatus. But the present invention should not be restricted thereto or thereby. The present invention is applicable for any other anti-lock control method and apparatus, as long as plural brake control channels are provided in the method and apparatus so as to control the brake hydraulic pressure for automotive wheels.

What is claimed is:

1. An anti-lock brake control method for an automotive vehicle in which a system wheel speed Vs is provided in each one of a plurality of brake control channels, respectively, and a brake hydraulic pressure for each wheel of said vehicle is alternately increased and decreased based on changes detected in said system wheel speed Vs so as to prevent said wheels from locking during braking of said vehicle, said anti-lock control method comprising the steps of:

setting an estimated vehicle speed Vv based on the highest wheel speed VwH selected among all wheel speeds;

presetting a pressure increase start condition relating to a state of recovery of each said system wheel speed Vs after a decrease in said brake hydraulic pressure, wherein said pressure increase start condition is met in a brake control channel when said system wheel speed Vs in said brake control channel is determined to exceed a speed $Vv-\Delta Vo$ corresponding to said estimated vehicle speed Vv reduced by a prescribed valve $\Delta Vo$;

increasing said brake hydraulic pressure in one of said brake control channels when said pressure increase start condition is met for that brake control channel and after said pressure increasing start condition is met in another of said brake control channels.

2. A three-channel anti-lock brake control method for preventing locking of wheels of a vehicle during braking thereof in which speeds Vw1 and Vw2 of left and right front wheel of said vehicle are handled as first and second system speeds Vs1 and Vs2, respectively, and a lower one of speeds Vw3 and Vw4 of left and right rear wheels is selected as a third system speed Vs3, so that a brake hydraulic pressure for the left front wheel, the right front wheel and the left and right rear wheels are controlled independently of each other through three brake control channels, said method comprising the steps of:

setting an estimated vehicle speed Vv based on the highest wheel speed VwH selected among all of said wheel speeds Vw1, Vw2, Vw3 and Vw4;

detecting a first time point at which one of said system speeds Vs1, Vs2 and Vs3 becomes higher than a speed $Vv-\Delta Vo$ which corresponds to said estimated vehicle speed Vv reduced by a prescribed valve $\Delta Vo$ detecting a second time point at which another one of said system speeds Vs1, Vs2 and Vs3 becomes higher than said speed $Vv-\Delta Vo$ after said first time point; and increasing said brake hydraulic pressure for said brake control channel corresponding to said one of said system speeds Vs1, Vs2 and Vs3 being higher than said speed $Vv-\Delta Vo$ from said second time point.

3. An anti-lock brake control apparatus for preventing locking of vehicle wheels during braking thereof by increasing and decreasing brake hydraulic pressure in each of a plurality of brake control channels, comprising:

means for sensing speeds Vw of said vehicle wheels;

means for setting system speeds Vs based on said speeds Vw of said vehicle wheels, each of said system speeds corresponding one of said brake control channels;

means for setting an estimated vehicle speed Vv based on the highest wheel speed VwH selected from among said wheel speeds;

means for detecting a predetermined condition for said system speeds Vs in each of said brake control channels and providing a detection signal indicative thereof, wherein said predetermined condition is met in one of said brake control channels when said system speeds Vs corresponding to that brake control channel becomes higher than a speed $Vv-\Delta Vo$ corresponding to said estimated vehicle speed lowered by a predetermined value $\Delta Vo$; and means for increasing a brake hydraulic pressure to control one of said system speeds after detection of said predetermined condition for said one of said systems speeds and in response to said detection signal indicating detecting of said predetermined condition for another one of said system speeds.

* * * * *